(12) United States Patent
Wang et al.

(10) Patent No.: US 12,086,100 B2
(45) Date of Patent: Sep. 10, 2024

(54) DATA DELETION IN MULTI-TENANT DATABASE

(71) Applicant: Stripe, Inc., San Francisco, CA (US)

(72) Inventors: Sheng Wang, Kirkland, WA (US); Tuan Doan, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 153 days.

(21) Appl. No.: 17/171,879

(22) Filed: Feb. 9, 2021

(65) Prior Publication Data

US 2022/0253404 A1 Aug. 11, 2022

(51) Int. Cl.
*G06F 16/11* (2019.01)
*G06F 16/16* (2019.01)
*G06F 16/22* (2019.01)
*G06F 16/901* (2019.01)

(52) U.S. Cl.
CPC .......... *G06F 16/122* (2019.01); *G06F 16/128* (2019.01); *G06F 16/162* (2019.01); *G06F 16/2228* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 9,514,164 B1 * | 12/2016 | Matic | G06F 16/2365 |
| 11,481,440 B2 * | 10/2022 | Yurchenko | G06F 16/278 |
| 11,620,338 B1 * | 4/2023 | Bullard | G06F 16/287 |
| | | | 707/798 |
| 2015/0302063 A1 * | 10/2015 | Nigam | G06F 16/278 |
| | | | 707/770 |
| 2016/0378791 A1 * | 12/2016 | Daga | G06F 16/24569 |
| | | | 707/769 |
| 2017/0124124 A1 | 5/2017 | Gackiere | |
| 2018/0373741 A1 * | 12/2018 | Martin | G06F 21/6218 |
| 2019/0325039 A1 | 10/2019 | Fernando et al. | |

(Continued)

FOREIGN PATENT DOCUMENTS

WO 2022173616 A1 8/2022

OTHER PUBLICATIONS

"International Application Serial No. PCT/US2022/014707, International Search Report mailed May 13, 2022", 3 pgs.

(Continued)

*Primary Examiner* — Neveen Abel Jalil
*Assistant Examiner* — John J Morris
(74) *Attorney, Agent, or Firm* — Foley & Lardner LLP (57) ABSTRACT

In an example embodiment, data in a multi-tenant database is organized as a graph representing the relationships among all documents and tenants. Specifically, each document is represented as a node in the graph and each tenant also is represented as a node. The relationships between the documents themselves, or between a document and a graph, are then represented as edges in the graph. A list of tenants whose data should be marked for deletion (e.g., former customers who no longer have a relationship with the entity maintaining the database) may be maintained. Periodically (e.g., once a week), this list of tenants and the relationship graph are fed as input into a graph search algorithm that generates smaller relationship graphs comprised only of documents associated with those accounts.

20 Claims, 6 Drawing Sheets

(56) References Cited

U.S. PATENT DOCUMENTS

2020/0012741 A1\* 1/2020 Bracholdt ............. G06F 16/212
2020/0242112 A1 7/2020 Jagota
2020/0342027 A1 10/2020 Reehil
2020/0404076 A1 12/2020 Mahadevan

OTHER PUBLICATIONS

"International Application Serial No. PCT/US2022/014707, Written Opinion mailed May 13, 2022", 3 pgs.
International Preliminary Report on Patentability for PCT App. PCT/US2022/014707 dated Aug. 15, 2023 (5 pages).

\* cited by examiner

DATA DELETION IN MULTI-TENANT DATABASE

TECHNICAL FIELD

The subject matter disclosed herein generally relates to the technical field of multi-tenant databases. Specifically, the subject matter pertains to data deletion in a multi-tenant database.

BACKGROUND

A multi-tenant database is a database in which a single instance of the database runs on a server and serves multiple tenants. A tenant is a group of users (such as employees of a single company) who share a common access with specific privileges to the database, Various multi-tenancy techniques may be applied to partially or completely isolate tenants on the same shared database.

At large scale, however, the management of data in a multi-tenant database can become quite complex. Practical and regulatory issues arise when a tenant is no longer a customer of the company that operates the database. For example, in some jurisdictions, in order to be compliant with data privacy regulations, there is a requirement to delete the data of users that no longer have a business relationship with the company operating the database. Concurrently, however, anti-money laundering regulations require companies to maintain merchant and related transactional records for a period of time (e.g., 5 years) after the end of the relationship.

Additionally, in large multi-tenant databases, deletion of documents can be difficult to perform reliably as there are often documents with relationships to other documents. As such, rather than appearing as a large database of disparate documents, the database appears more as an interconnected graph of documents, connected by dependencies to one another. A particular document itself, for example, may have no indication of a specific correlation with a particular tenant but may depend on a document that does have a specific correlation with that particular tenant. To further complicate matters, it is possible for a single document to correspond to multiple tenants, creating complexity when one of the tenants is no longer a customer but another of the tenants is a customer.

BRIEF DESCRIPTION OF THE DRAWINGS

Some embodiments are illustrated by way of example and not limitation in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, data in a multi-tenant database is organized as a graph representing the relationships among all documents and tenants. Specifically, each document is represented as a node in the graph and each tenant also is represented as a node. The relationships between the documents themselves, or between a document and a graph, are then represented as edges in the graph. In a large database, the size of this relationship graph may be on the order of terabytes, and there could be well over a trillion edges. It is possible that this relationship graph may have circular dependencies, where traversal of the graph in certain directions may cause the traversal to repeat upon itself.

A list of tenants whose data should be marked for deletion (e.g., former customers who no longer have a relationship with the entity maintaining the database) may be maintained. Periodically (e.g., once a week), this list of tenants and the relationship graph are fed as input into a graph search algorithm that generates smaller relationship graphs composed only of documents associated with those accounts.

Figure 1:
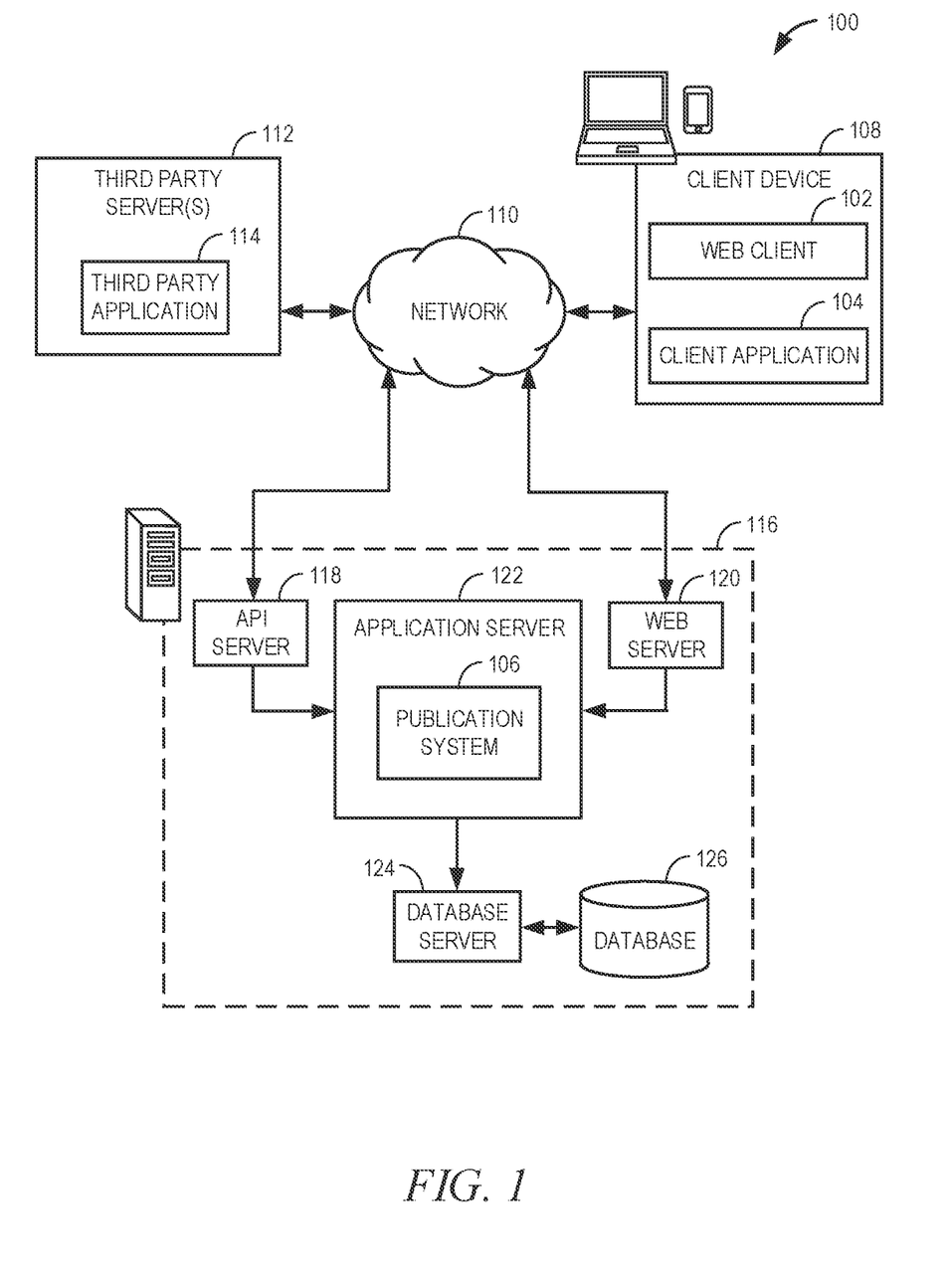
FIG. 1 is a block diagram illustrating a high-level network architecture, according to an example embodiment.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
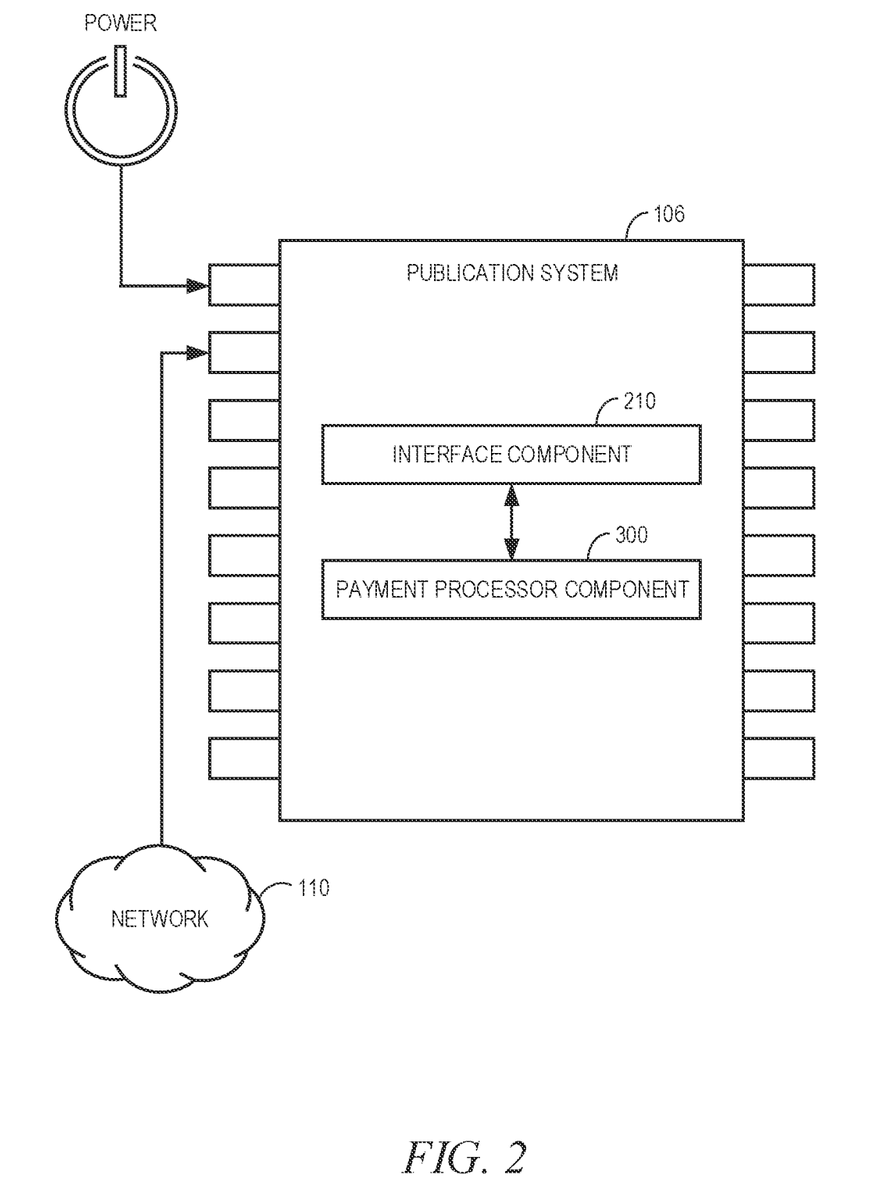
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor in accordance with the methods described herein with reference to the accompanying drawings.

Figure 3:
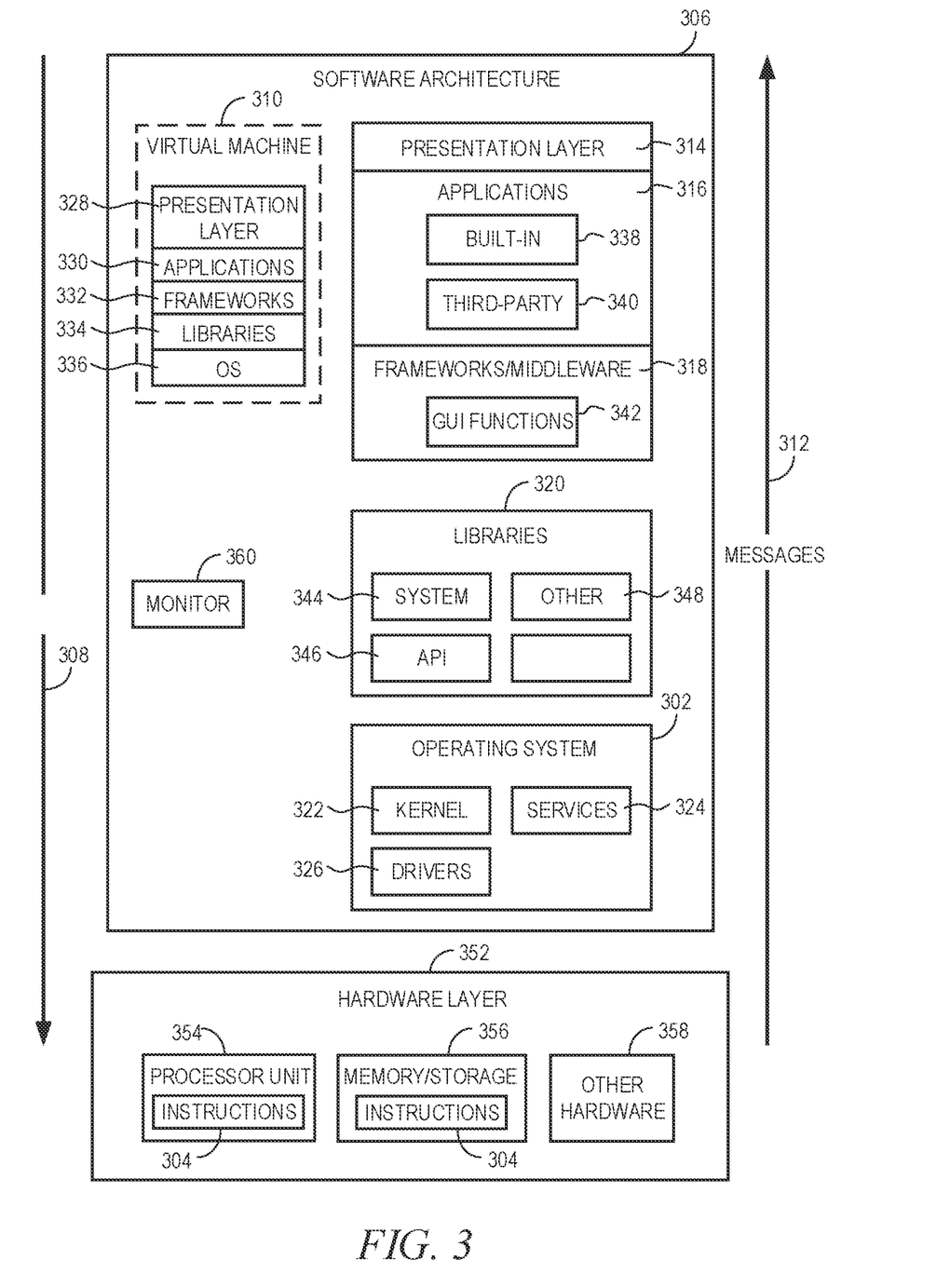
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
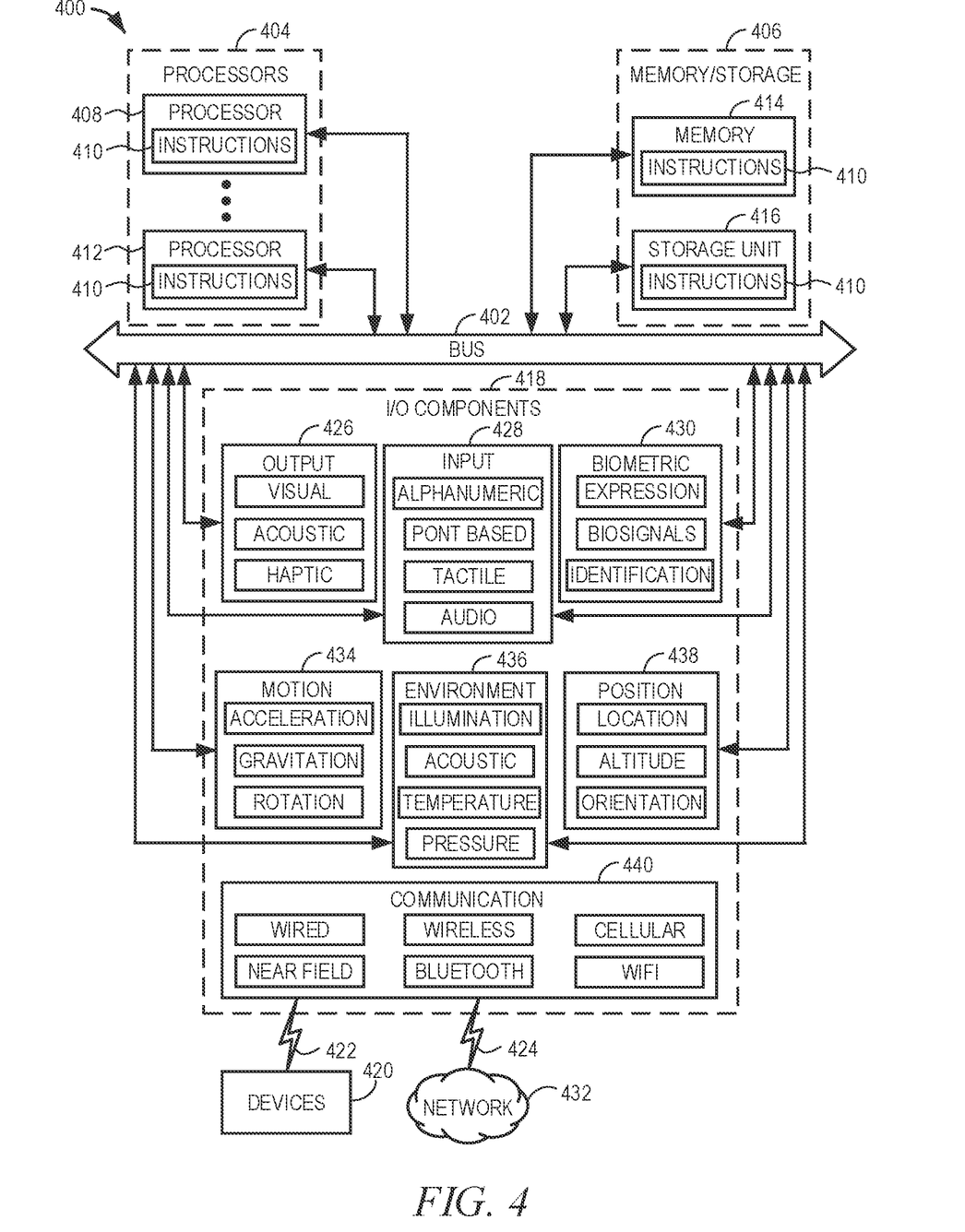
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components, a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data. Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
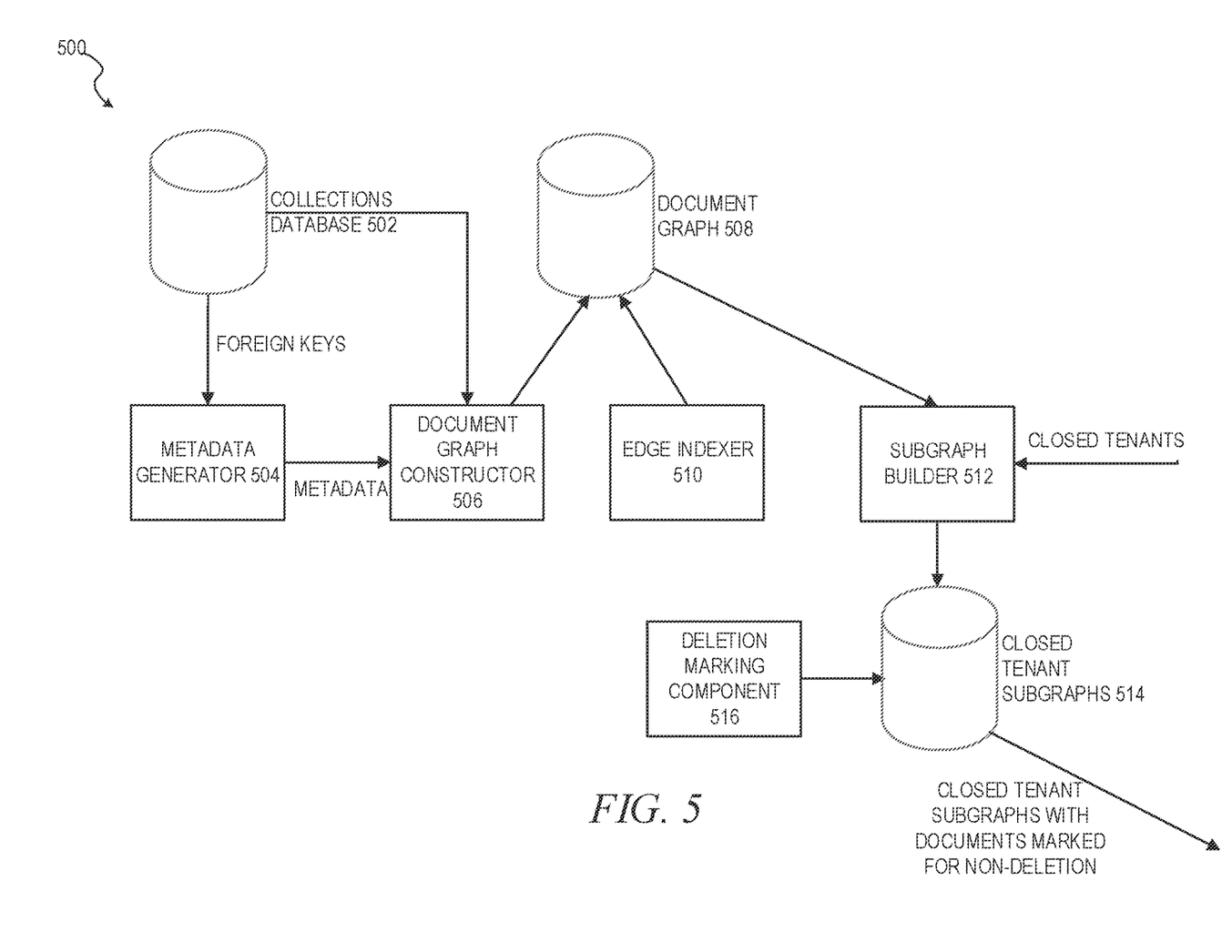
FIG. 5 is a block diagram illustrating a data deletion framework architecture in accordance with an example embodiment.

In an example embodiment, the payment processor component 300 may be one source of data stored in a collections database. The collections database includes collections of documents that have relationships to one another and to one or more tenants of a multi-tenant database. FIG. 5 is a block diagram illustrating a data deletion framework architecture 500 in accordance with an example embodiment. It should be noted that this is merely one example architecture and is not intended to be limiting. Here, the collections database 502 contains a plurality of document collections. Each document collection may include one or more documents that have some relationship with one another, but that also might have relationships with documents of other collections. Additionally, the collections may be used/accessed by one or more tenants, either making the collections database 502 itself a multi-tenant database or at least containing documents extracted from a multi-tenant database.

In an example embodiment, the collections database 502 may be in the form of shard snapshots, meaning views of the documents at particular times from one or more shards of a database. A metadata generator 504 may obtain the foreign keys from the collections database 502 and generate metadata based on the foreign keys. This metadata may indicate, for any given document collection, all of the foreign keys that one can expect to find for documents in the document collection. In an example embodiment, the metadata may be in the form of a JavaScript Object Notation (JSON) file.

Furthermore, in addition to the list of foreign keys for each document collection, the metadata may also indicate whether each foreign key is optional, whether each foreign key is a back edge, and whether each foreign key represents an autodelete edge. Essentially, each foreign key represents an edge from one document to another. The metadata generator 504 determines those various bits of information about each edge and includes it in the generated metadata.

Below is an example of a metadata. JSON file generated by the metadata generator 504:

```
{
  "user_account_access": [
    {
      "dstModel": "merchants",
      "propName": "merchant",
      "propType": "String",
      "optional": "false",
      "autoDelete": true
    },
    {
      "dstModel": "users",
      "propName": "user",
      "propType": "String",
      "optional": "false",
      "autoDelete": true,
      "backedge": true
    },
    {
      "dstModel": "roles",
      "propName": "role",
      "propType": "String",
      "optional": "true"
    }
  ],
  ...
}
```

This metadata JSON file indicates several things for the user_account_access collection. The first is that there are three foreign keys, called merchant, user, and roles. The second is that one of these (roles) is optional. This means it may be nil in the document. The third is that one of the foreign keys (user) is a backedge. This means that while all user_account_access documents in the collections database 502 may have a foreign key pointing to a document in the user collection, it should really be the other way around for purposes of data deletions. Specifically, the user document should have the foreign key to the user_account_access document instead. This may be learned via annotations. This allows a user document to have a path of foreign keys that can be followed back to the owning tenant. The fourth is that two of the edges are auto_delete edges. An auto-delete edge is an edge that should be followed to determine the respective tenant owner of the document.

Referring back to FIG. 5, a document graph constructor 506 can build a document graph 508 using the metadata and the collections database 502. The reason for having a separate document graph 508 rather than just use the collections database 502 directly (since it has the foreign keys already) is that the collections database 502 has join models, which makes it incompatible with the described data deletion solution. Consider three models M, UAA, and U, where the foreign key relationships between them are M->UAA-<U. Given only a U document, it is not feasible to reliably know which M owns it. The metadata generator allows for this information to be reliably known, through the use of back edges and auto-delete edges. A backedge is one that should be inverted while all edges that are further marked as auto-delete are the ones that should be followed. All back edges are also auto-delete edges (because the point of inverting them is so that they can be followed), but not all regular forward edges are necessarily auto-delete edges.

Additionally, as will be seen, using a separate document graph 508 allows for the use of inverted indexes, which makes large amounts of documents much quicker to access than in the original collections database 502.

Shard snapshots may be maintained, and the construction of the document graph may include iterating through all of these shard snapshots and converting the Binary JSON (BSON) into a list of edges.

The following is an example of a single input from a shard snapshot:

| Key (string) | Value (BSON) |
| --- | --- |
| "user_account_access/uaa_AUVGACeJfIEbcV" | {"_id": "uaa_AUVGACeJfIEbcV", "created": 1492421701.583592, "deleted"=false, "email_on_application_fee": false, "email_on_successful_charge": false, "merchant": "acct_1A9WG9EaxrVWfmL9", "origin": nil, "role": "urole_admin", "updated" 1534618255.3689868, "user": "usr_AUVGUQnk1wZMRb"} |

Note that every input from a shard snapshot is a 2-tuple where the key is a string and the value is a BSON. The value in the collections database document itself is in BSON form and the key indicates the collection and document's ID.

The document graph constructor 506 then extracts the three foreign keys by looking at the JSON fields named merchant, user, and role:

```
user_account_access/uaa_AUVGACeJfIEbcV
merchants/acct_1A9WG9EaxrVWfmL9
user_account_access/uaa_AUVGACeJfIEbcV
users/usr_AUVGUQnk1wZMRb
```

```
user_account_access/uaa_AUVGACeJfIEbcV
roles/urole_admin
```

Each line represents an edge where the first field is the source vertex ID and the second field is the destination vertex ID.

The edge pointing to the users document is a backedge and should be flipped:

```
user_account_access/uaa_AUVGACeJfIEbcV
merchants/acct_1A9WG9EaxrVWfmL9
users/usr_AUVGUQnk1wZMRb
user_account_access/uaa_AUVGACeJfIEbcV
user_account_access/uaa_AUVGACeJfIEbcV
roles/urole_admin
```

And then two of them are marked as auto_delete:

```
user_account_access/uaa_AUVGACeJfIEbcV
merchants/acct_1A9WG9EaxrVWfmL9
true
users/usr_AUVGUQnk1wZMRb
user_account_access/uaa_AUVGACeJfIEbcV
true
user_account_access/uaa_AUVGACeJfIEbcV
roles/urole_admin
false
```

The output of the document graph construction job looks like this and is stored in document graph 508. Notably, while most graphs are represented by a set of edges and a set of nodes, this document graph 508 may be represented as only a set of edges. This is because the system only cares about documents (or nodes) that have foreign keys (edges). All the documents to be deleted can be extracted from the set of edges, and all documents have a path back to their respective owning tenant.

An edge indexer 510 indexes each of the edges in the document graph 508. Once indexed, the document graph 508 is able to be traversed easily using queries, which are described in more detail below.

When a tenant ceases to be a tenant, a distributed computing framework such as Apache Spark can be used to find all connected documents, or candidates for deletion. These are considered candidates because finding them in this step does not mean that they will necessarily be deleted. This happens in two phases. In the first phase, a smaller and more manageable subgraph rooted at the closed tenant is obtained by traversing backwards (i.e. following all inbound edges) starting from the closed tenant. In an example embodiment, this computation may additionally be parallelized for all tenants being processed for pre-deletion at once, using the distributed capabilities of the distributed computing framework. A job to perform this takes a list of identifications, in this case the closed tenants, and outputs a list of all inbound edges by running a query that looks like, for example "return all edges" where "dst_id" is in "merchants/acct_1038xl" and visited—false. This is performed by subgraph builder 512. The result is a list of edges that may then look like this:

| EdgeID | Tenant | AutoDelete Edge? |
|---|---|---|
| charges/ch_1038y3 | merchants/acct_1038xI | true |
| singleusecard/tok_1038y4 | merchants/acct_1038xI | false |
| creditcards/card_1038y2 | merchants/acct_1038xI | false |
| bankaccounts/ba_103Abz | merchants/acct_1038xI | true |

Then the subgraph builder 512 takes a list of all source IDs of the returned edges and reruns the job with those as the input. In other words, at step 0, the input is the tenant or list of tenants that have left. At later steps, the input is the list of all source IDs of all the edges returned from the previous step. This is iterated until no more edges are found. Note that after each step, every edge that has been found may be marked as visited to avoid getting stuck in cycles. All of the edges that are found make up the closed tenant subgraph for the corresponding closed tenant, and every distinct node/document is a candidate for deletion.

At this point, the subgraph builder 512 has obtained all documents with a path back to the initial set of closed tenants and saved them as a combined graph for all the tenants to be closed. This can then be later broken out into separate closed tenant subgraphs 514. However, the system still needs to find out which ones may also lead back to an active tenant (if any). A deletion marking component 516 may perform this task using queries. The query for that may look like this: Return all edges where "src_id" is in ["charges/ch_1038y3", . . . ] and "visited"—false. The nodes/documents found in this phase are not candidates for deletion. They are part of the subgraph, but they only serve to tell the system which documents from phase 1 cannot be deleted due to being connected to other active tenants. The deletion marking component 516 marks which documents in the closed tenant subgraphs 514 should not be deleted because they are still connected to an active tenant. The result is a set of closed tenant subgraphs with documents marked for non-deletion. As will be described later, the actual deletion may occur later and may include deleting all documents in these closed tenant subgraphs 514 that are not marked for non-deletion.

The actual deletion may occur once a document passes a predetermined retention period without having been accessed. Specifically, if a document in one of the closed tenant subgraphs is accessed at any point, then that document is marked for non-deletion. This may occur, for example, if a non-closed tenant accesses the document after the process above has been run for the closed tenant. The retention period may be set based upon legal requirements indicating how long a document needs to be retained prior to it being permissible to be deleted.

Figure 6:
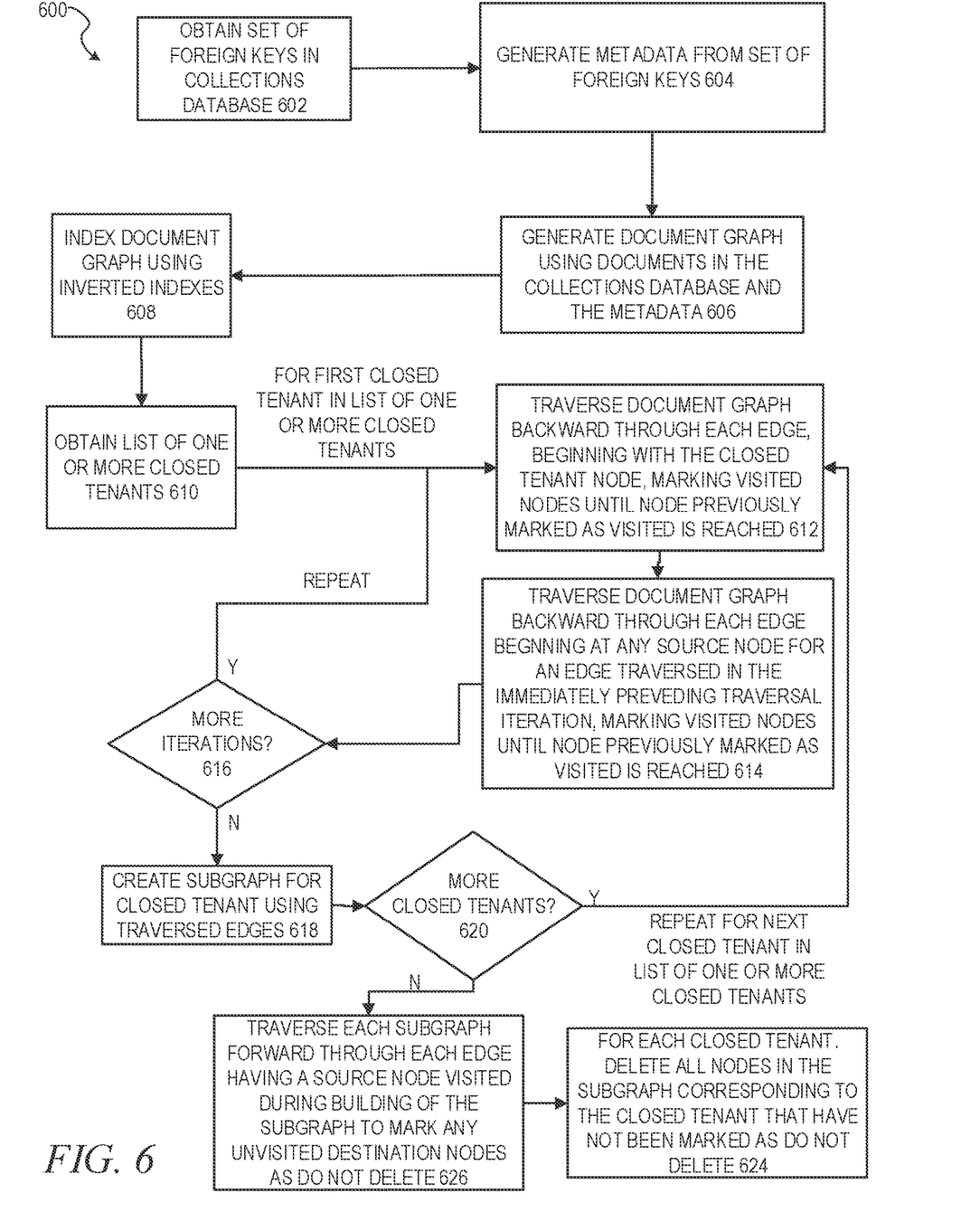
FIG. 6 is a flow diagram illustrating a method for deleting documents in a multi-tenant database, in accordance with an example embodiment.

FIG. 6 is a flow diagram illustrating a method 600 for deleting documents in a multi-tenant database, in accordance with an example embodiment. At operation 602, a set of foreign keys in a collections database is obtained. At operation 604, metadata is generated from the set of foreign keys. At operation 606, a document graph is generated using documents in the collections database and the metadata. The document is generated so that it has a first plurality of nodes, a second plurality of nodes, and edges connecting nodes in the first plurality of nodes and the second plurality of nodes, each node in the first plurality of nodes representing a document stored in the multi-tenant database, each node in the second plurality of nodes representing a tenant of the multi-tenant database, each edge connecting a node in the first plurality of nodes to a node in the second plurality of nodes representing ownership of a corresponding document by a corresponding tenant, and each edge connecting a node in the first plurality of nodes to another node in the first plurality of nodes indicating a relationship between respective documents, the document graph having one or more cycles, each edge having a direction from a source node to a target node. At operation 608, the document graph is indexed using inverted indexes.

At operation 610, a list of one or more closed tenants is obtained. This list may include any tenants who have severed their relationship with the entity maintaining the multi-tenant database since the last time the method 600 was run. A subgraph is then created for each of the one or more closed tenants using a series of iterative steps, beginning with a first tenant in the list of one or more closed tenants. At operation 612, the document graph is traversed backward through each edge beginning at a node in the second plurality of nodes corresponding to the closed tenant, wherein at each iteration visited nodes are marked as visited and processing of the iteration stops when a node previously marked as visited is reached. At operation 614, the document graph is again traversed backward through each edge, this time beginning at any source node for an edge traversed in the immediately preceding traversal iteration, again marking visited nodes as visited and processing of the iteration stopping when a node previously marked as visited is reached. At operation 616, it is determined if there are any more iterations to perform for this closed tenant (i.e., if there are any edges traversed in the immediately preceding traversal iteration). If so, then the method 600 iterates to operation 612. If not, then at operation 618 a subgraph for this closed tenant is created using the traversed edges from operations 614 and 616.

At operation 620, it is determined if there are any more closed tenants in the list of one or more closed tenants. If so, then the method 600 loops back to operation 612 for the next closed tenant in the list of one or more closed tenants.

If not, then at operation 626, each subgraph is traversed forward through each edge having a source node visited during building of the subgraph to identify any unvisited destination nodes, while marking the identified unvisited destination nodes as do not delete. Then at operation 624, for each of the one or more closed tenants in the list of one or more closed tenants, all nodes in the subgraph corresponding to the closed tenant that have not been marked as do not delete are deleted.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 404 in FIG. 4) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor, example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store), More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
obtaining a document graph of a multi-tenant database, the document graph having a first plurality of nodes, a second plurality of nodes, and edges connecting nodes in the first plurality of nodes and the second plurality of nodes, each node in the first plurality of nodes representing a document stored in the multi-tenant database, each node in-the second plurality of nodes representing a tenant of the multi-tenant database, each edge connecting a node in the first plurality of nodes to a node in the second plurality of nodes representing ownership of a corresponding document by a corresponding tenant, and each edge connecting a node in the first plurality of nodes to another node in the first plurality of nodes indicating a relationship between respective documents, the document graph having one or more cycles, each edge having a direction from a source node to a target node;
obtaining a list of one or more closed tenants, wherein a closed tenant is a former customer who no longer has a relationship with an entity associated with the multi-tenant database;
building a subgraph for each of the one or more closed tenants, each subgraph being an acyclical graph formed by iteratively traversing the document graph in a backwards direction through-each edge beginning at a node in the second plurality of nodes corresponding to a closed tenant of the one or more closed tenants and proceeding to a root node of the document graph, wherein at each iteration visited nodes are marked as visited and processing of the iteration stops when a node previously marked as visited is reached, and wherein each iteration begins at all source nodes for an edge traversed in an immediately preceding iteration, the subgraph including a first group of the first plurality of nodes, the closed tenant excluded from the multi-tenant database;
traversing each subgraph in a forward direction through each edge having a source node visited during building of the subgraph to identify tenant nodes corresponding to the documents among the first group of the first plurality of nodes;
identifying, for all of the documents among the first group of the first plurality of nodes, corresponding auto-delete edges of the subgraph for at least one of the closed tenants;
traversing, for at least one of the one or more closed tenants, all of the auto-delete edges for the subgraph; and
deleting, for the at least one of the one or more closed tenants and with the traversing all of the auto-delete edges, all documents from the multi-tenant database linked with the corresponding auto-delete edges, the plurality of documents each corresponding to a second group of the first plurality of nodes from the subgraph that excludes documents corresponding to the identified tenant nodes.

2. The method of claim 1, further comprising forming the document graph by:
obtaining a set of foreign keys in a collections database;
generating metadata from the set of foreign keys; and
generating the document graph using documents in the collections database and the metadata.

3. The method of claim 2, wherein the metadata indicates, for a collection of documents in the collections database, all foreign keys for each document in the collection of documents.

4. The method of claim 3, wherein the metadata further indicates that a role corresponding to a foreign key among the foreign keys indicated by the metadata is optional.

5. The method of claim 3, wherein the metadata further indicates which foreign keys are a backedge.

6. The method of claim 3, wherein the metadata further indicates which foreign keys represent corresponding auto-delete edges.

7. The method of claim 2, further comprising indexing each edge in the document graph using an inverted index.

8. The method of claim 2, wherein the collections database is in the form of shard snapshots.

9. A system comprising:
a network;
one or more processors; and
a memory storing instructions that, when executed by at least one processor among the one or more processors, cause the at least one processor to perform operations comprising:
obtaining a document graph of a multi-tenant database, the document graph having a first plurality of nodes, a second plurality of nodes, and edges connecting nodes in the first plurality of nodes and the second plurality of nodes, each node in the first plurality of nodes representing a document stored in the multi-tenant database, each node in the second plurality of nodes representing a tenant of the multi-tenant database, each edge connecting a node in the first plurality of nodes to a node in the second plurality of nodes representing ownership of a corresponding document by a corresponding tenant, and each edge connecting a node in the first plurality of nodes to another node in the first plurality of nodes indicating a relationship between respective documents, the document graph having one or more cycles, each edge having a direction from a source node to a target node;

obtaining a list of one or more closed tenants, wherein a closed tenant is a former customer who no longer has a relationship with an entity associated with the multi-tenant database;

building a subgraph for each of the one or more closed tenants, each subgraph being an acyclical graph formed by iteratively traversing the document graph in a backwards direction through each edge beginning at a node in the second plurality of nodes corresponding to a closed tenant of the one or more closed tenants and proceeding to a root node of the document graph, wherein at each iteration visited nodes are marked as visited and processing of the iteration stops when a node previously marked as visited is reached, and wherein each iteration begins at all source nodes for an edge traversed in an immediately preceding iteration, the subgraph including a first group of the first plurality of nodes, the closed tenant excluded from the multi-tenant database;

traversing each subgraph in a forward direction through each edge having a source node visited during building of the subgraph to identify tenant nodes corresponding to the documents among the first group of the first plurality of nodes;

identifying, for all of the documents among the first group of the first plurality of nodes, corresponding auto-delete edges of the subgraph for at least one of the closed tenants;

traversing, for at least one of the one or more closed tenants, all of the auto-delete edges for the subgraph; and deleting, for the at least one of the one or more closed tenants and with the traversing all of the auto-delete edges, all documents from the multi-tenant database linked with the corresponding auto-delete edges, the plurality of documents each corresponding to a second group of the first plurality of nodes from the subgraph that excludes documents corresponding to the identified tenant nodes.

10. The system of claim 9, wherein the operations further comprise forming the document graph by:
obtaining a set of foreign keys in a collections database;
generating metadata from the set of foreign keys; and
generating the document graph using documents in the collections database and the metadata.

11. The system of claim 10, wherein the metadata indicates, for a collection of documents in the collections database, all foreign keys for each document in the collection of documents.

12. The system of claim 11, wherein the metadata further indicates that a role corresponding to a foreign key among the foreign keys indicated by the metadata is optional.

13. The system of claim 11, wherein the metadata further indicates which foreign keys are a backedge.

14. The system of claim 11, wherein the metadata further indicates which foreign keys represent corresponding auto-delete edges.

15. The system of claim 10, further comprising indexing each edge in the document graph using an inverted index.

16. The system of claim 10, wherein the collections database is in the form of shard snapshots.

17. A non-transitory machine-readable medium comprising instructions which, when read by a machine, cause the machine to perform operations comprising:

obtaining a document graph of a multi-tenant database, the document graph having a first plurality of nodes, a second plurality of nodes, and edges connecting nodes in the first plurality of nodes and the second plurality of nodes, each node in the first plurality of nodes representing a document stored in the multi-tenant database, each node in the second plurality of nodes representing a tenant of the multi-tenant database, each edge connecting a node in the first plurality of nodes to a node in the second plurality of nodes representing ownership of a corresponding document by a corresponding tenant, and each edge connecting a node in the first plurality of nodes to another node in the first plurality of nodes indicating a relationship between respective documents, the document graph having one or more cycles, each edge having a direction from a source node to a target node;

obtaining a list of one or more closed tenants, wherein a closed tenant is a former customer who no longer has a relationship with an entity associated with the multi-tenant database;

building a subgraph for each of the one or more closed tenants, each subgraph being an acyclical graph formed by iteratively traversing the document graph in a backwards direction through each edge beginning at a node in the second plurality of nodes corresponding to a closed tenant of the one or more closed tenants and proceeding to a root node of the document graph, wherein at each iteration visited nodes are marked as visited and processing of the iteration stops when a node previously marked as visited is reached, and wherein each iteration begins at all source nodes for an edge traversed in an immediately preceding iteration, the subgraph including a first group of the first plurality of nodes, the closed tenant excluded from the multi-tenant database;

traversing each subgraph in a forward direction through each edge having a source node visited during building of the subgraph to identify tenant nodes corresponding to the documents among the first group of the first plurality of nodes;

identifying, for all of the documents among the first group of the first plurality of nodes, corresponding auto-delete edges of the subgraph for at least one of the closed tenants;

traversing, for at least one of the one or more closed tenants, all of the auto-delete edges for the subgraph; and deleting, for the at least one of the one or more closed tenants and with the traversing all of the auto-delete edges, all documents from the multi-tenant database linked with the corresponding auto-delete edges, the plurality of documents each corresponding to a second group of the first plurality of nodes from the subgraph that excludes documents corresponding to the identified tenant nodes.

18. The non-transitory machine-readable medium of claim 17, wherein the operations further comprise forming the document graph by:
  obtaining a set of foreign keys in a collections database;
  generating metadata from the set of foreign keys; and
  generating the document graph using documents in the collections database and the metadata.

19. The non-transitory machine-readable medium of claim 18, wherein the metadata indicates, for a collection of documents in the collections database, all foreign keys for each document in the collection of documents.

20. The non-transitory machine-readable medium of claim 19, wherein the metadata further indicates that a role corresponding to a foreign key among the foreign keys indicated by the metadata is optional.

* * * * *